United States Patent
Silvery et al.

(10) Patent No.: US 12,155,274 B2
(45) Date of Patent: Nov. 26, 2024

(54) ELECTRIC MACHINE

(71) Applicant: Schaeffler Technologies AG & Co. KG, Herzogenaurach (DE)

(72) Inventors: Christian Silvery, Walzbachtal (DE); Mike Czerlewitz, Bühl (DE); Matthias Kästle, Lauf (DE); Andreas Ruppert, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 437 days.

(21) Appl. No.: 17/606,139

(22) PCT Filed: Mar. 30, 2020

(86) PCT No.: PCT/DE2020/100260
§ 371 (c)(1),
(2) Date: Oct. 25, 2021

(87) PCT Pub. No.: WO2020/216405
PCT Pub. Date: Oct. 29, 2020

(65) Prior Publication Data
US 2022/0311312 A1    Sep. 29, 2022

(30) Foreign Application Priority Data

Apr. 26, 2019  (DE) .................... 10 2019 110 835.7
Aug. 6, 2019   (DE) .................... 10 2019 121 198.0

(51) Int. Cl.
H02K 11/25        (2016.01)
(52) U.S. Cl.
CPC ......... *H02K 11/25* (2016.01); *H02K 2203/09* (2013.01)

(58) Field of Classification Search
CPC ...... H02K 11/25; H02K 2203/09; H02K 3/00; H02K 3/44; H02K 3/48; H02K 3/50; H02K 3/52
See application file for complete search history.

(56) References Cited

U.S. PATENT DOCUMENTS

| | | | |
|---|---|---|---|
| 8,022,584 B2 * | 9/2011 | Heim ..................... | H02K 11/25 310/68 C |
| 8,643,243 B2 * | 2/2014 | Bliemeister ............. | H02K 3/38 310/214 |
| 2013/0270971 A1 * | 10/2013 | Dorner ................... | H02K 3/522 310/68 B |

FOREIGN PATENT DOCUMENTS

| | | |
|---|---|---|
| DE | 102013214386 A1 | 1/2015 |
| DE | 102019103191 A1 | 8/2020 |

(Continued)

OTHER PUBLICATIONS

EP-0727864-A2, Erneker et al., all pages (Year: 1996).*
FR-3046505-A1, Ben, all pages (Year: 2017).*

*Primary Examiner* — Naishadh N Desai

(57) ABSTRACT

An electric machine includes a stator having a winding including a plurality of conductors assigned to one or more phases and at least one temperature sensor assembly having a temperature sensor section with a temperature sensor for detecting the temperature of the winding. The ends of at least one part of the conductors on the inner or outer circumference of the winding protrude axially or radially over the winding, wherein an interconnection ring comprising at least one conductor bridge is placed axially or radially on the winding. The ends of at least two respective conductors assigned to a phase protrude radially or axially outwards. The temperature sensor section has a sensor housing which is introduced into a housing recess provided on the interconnection ring in such a way that the temperature sensor is (Continued)

in thermal contact with the connection conductor or the connection bridge.

11 Claims, 5 Drawing Sheets

(56) References Cited

FOREIGN PATENT DOCUMENTS

| EP | 0727864 | A2 |   | 8/1996 |
|----|---------|----|---|--------|
| FR | 3046505 | A1 | * | 7/2017 |
| GE | 0727864 | A2 | * | 1/1996 |

* cited by examiner

ELECTRIC MACHINE

CROSS-REFERENCE TO RELATED APPLICATIONS

This application is the U.S. National Phase of PCT Appln. No. PCT/DE2020/100260 filed Mar. 30.2020, which claims priority to DE 102019110835.7 filed Apr. 26, 2019 and DE 102019121198.0 filed Aug. 6, 2019, the entire disclosures of which are incorporated by reference herein.

TECHNICAL FIELD

The disclosure relates to an electric machine comprising a stator having a winding, comprising a plurality of conductors assigned to one or more phases, which are connected to one another, as well as at least one temperature sensor assembly having a temperature sensor section with a temperature sensor for detecting the temperature in the region of the winding.

BACKGROUND

Electric machines comprise a rotor and a stator and are used in different areas of application. The use of electric machines for electric hybrid vehicles and electric vehicles, or for hub drives is to be mentioned only as an example. If such an electric machine is used as a drive machine, it is usually designed as an internal rotor, i.e., the stator surrounds the internal rotor. A moving magnetic field is generated via the stator, which causes the rotor to rotate. For this purpose, the stator has a winding consisting of a large number of conductors, wherein the conductors are assigned to one or usually more than phase. The winding is guided around the stator teeth in a manner known per se.

Not only the number of phases is included in the design of the winding geometry, but also the number of wires per phase as well as the number of wires per slot within the stator toothing and the number of pole pairs. This variety of conductors and winding parameters creates a complex network of conductors that is built up using different winding technologies. Examples include hairpin or bar wave windings. Here, the conductors are formed by means of rods bent into a U-shape, which are put together to form a winding cage. The conductors are laid on a plurality of radial levels, with the conductors moving from level to level, so to speak. To form these meandering, circumferential conductors, they are to be connected accordingly at their ends, which is usually done by welding the conductor ends that are adjacent to one another. The conductor ends converge at one point or on one winding side in the form of the so-called star, where they are connected to one another. In this region, the individual phases must also be connected to an external power supply, i.e., a power connection that is used to generate the magnetic field.

During the operation of the electric machine, the temperature of individual components must be monitored, for which purpose appropriate temperature sensors, such as PTC or NTC sensors, are used. One of the regions where the temperature is to be measured is the winding, since the winding is one of the hottest points of the stator of the electric machine, where a temperature sensor can be installed. The hottest point of the stator is located in the region of the hairpin or bar wave winding, precisely in the axial center of the laminated core. However, since this point cannot be reached in order to integrate a temperature sensor, the outer region of the winding is selected. For this purpose, the temperature sensor is installed inside the stator, which means that it usually has to be installed at an early stage of the production process. In order to measure the temperature in the winding area as accurately as possible, it is desirable to install the temperature sensor as close as possible to the winding or the winding head, since media flows in the interior, for example water, air, oil, etc., can impair the temperature measurement and the measurement therefore becomes inaccurate as the distance between the temperature sensor and the winding or the winding head increases. The arrangement of the temperature sensor, especially on a particularly tightly or compactly wound winding such as a hairpin or bar wave winding, is particularly complicated.

SUMMARY

The disclosure is based on the problem of providing an electric machine which is improved in comparison.

To solve this problem, it is provided according to the disclosure in an electric machine of the type mentioned at the outset that the ends of at least one part of the conductor on the inner circumference and/or on the outer circumference of the winding protrude axially or radially over the winding, wherein an interconnection ring comprising at least one conductor bridge is placed axially or radially on the winding, to which conductor bridge at least one part of the conductor is connected, wherein the ends of at least two respective conductors assigned to a phase protrude radially or axially outwards, to which at least one connection conductor is connected, which is also connected to a power connection arranged radially outside the winding, and wherein the temperature sensor section has a sensor housing which is introduced into a housing recess provided on the interconnection ring in such a way that the temperature sensor is in thermal contact with the connection conductor or the conductor bridge.

According to the disclosure, the actual conductor interconnection, i.e., the interconnection of the individual conductors to form the corresponding phase-specific meander structures, and the interconnection for coupling with the power supply are to be separated via a high-voltage terminal. An interconnection ring is used for the actual conductor interconnection of the winding, i.e., a conductor ring placed separately on the winding, which has one or more conductor bridges. The interconnection ring placed axially or radially on the winding engages in the region of the conductor ends projecting axially or radially at the inner circumference and/or at the outer circumference of the winding. The conductor ends are assigned to the individual conductor sections, unless they are connected to one another on other, for example further inward, radial planes. The conductor ends are connected to the interconnection ring, usually welded to it accordingly, so that the corresponding phase-specific conductor structures or conductor connections are generated via the interconnection ring.

To connect the winding to the actual power connection, according to the disclosure, corresponding conductor ends that are assigned to a phase are guided protruding radially or axially outward. Via one or more connection conductors connected to these conductor ends, the conductors and thus the winding are connected to the HV power connection near the winding, which can also be referred to as an HV terminal and has a corresponding number of individual phase-related terminals, with a welded connection also preferably being provided here.

As described, the interconnection ring has one or more separate conductor bridges to which the ends of the conductors are connected. These conductor bridges are suitably stable metal sheets, for example made of copper, which are geometrically shaped to reach the conductor ends to be connected. They allow easy bridging of corresponding distances in both circumferential and radial directions. For easy connection of the conductor bridge to the corresponding conductor ends, corresponding radially or axially projecting connection sections are provided on the bridge side, to which the ends of the conductors are welded. The interconnection ring is therefore designed as a star distributor, comprising the corresponding conductor bridges and the associated, radially or axially protruding connection sections.

According to the disclosure, the temperature sensor is now integrated on the winding side by being positioned on the interconnection ring in such a way that it is in thermal contact either with the connection conductor, via which the conductor ends are in contact with the HV power connection, or with a conductor bridge. For this purpose, the temperature sensor section according to the disclosure has a sensor housing in or on which the temperature sensor is provided. In the assembly position, this sensor housing is inserted in a housing recess provided on the interconnection ring, which is specifically adapted to the geometry of the sensor housing so that it can be fixed sufficiently firmly. The arrangement of the sensor housing is now such that the temperature sensor is in thermal contact with the connection conductor or conductor bridge. Thus, according to the disclosure, a defined mounting interface is created on the interconnection ring via the sensor housing as well as the housing recess, which enables the temperature sensor assembly to be mounted in a simple manner. This ensures that reproducible assembly and, of course, dismantling in the event of maintenance is possible in a simple manner. In addition to an ideal positioning of the temperature sensor, a very precise and reliable measurement is also possible, especially since due to the contacting of the temperature sensor with the connection conductor or the conductor bridge, a very good heat transfer between the measuring components is achieved, so that undesired error influences and measured value deviations are reliably avoided. Furthermore, it is possible to measure the temperature not only in a radially or axially outer edge area of the stator winding, which is subject to a different operating temperature due to the increased heat dissipation, but directly integrated on the interconnection ring directly on current-carrying and therefore heating winding elements or components. In addition, integration on the interconnection ring also provides protection against external influences such as media flows (water, oil, air, etc.), which cannot reach the temperature sensor.

The sensor housing is preferably fixed in the housing recess by a latching or clamp connection. A secure, reproducible sensor fixation can be achieved by means of such a latching or clamp connection, i.e., ultimately a form-fitting fixation. During assembly, it is only necessary to insert the sensor housing into the housing recess and to latch or clamp it there, for example. This automatically ensures correct positioning on the one hand and thermal contact between the temperature sensor and the component to be measured on the other.

To realize a latching connection, two spring arms are preferably provided on the sensor housing, which jam in the housing recess or snap into latching recesses provided on the housing recess with latching elements provided on them. It is therefore only necessary to push the unit into the actual latching position, where the latching connection is then automatically established.

The temperature sensor section itself preferably protrudes from the sensor housing with an end having the temperature sensor. That is, the region comprising the temperature sensor is ultimately exposed so that it can be brought into direct contact with the connection conductor or conductor bridge and easy thermal coupling can be achieved.

According to an advantageous further development of the disclosure, it is possible to provide a spring element on the sensor housing via which it is spring-loaded in the direction of the connection conductor or conductor bridge. This spring element ensures that the sensor housing, and thus also the temperature sensor, is always brought into a defined contact or thermal contact with the connection conductor or conductor bridge, since the spring element pushes it against it. This spring element also makes it possible to easily compensate for any geometric tolerances, so that defined measuring conditions are always achieved. For example, a simple curved leaf spring that protrudes slightly from the sensor housing and is supported on a corresponding abutment section of the housing recess is used as such a spring element.

The sensor housing itself preferably consists of a plastic potting composite in which the temperature sensor section and, if provided, also the spring element are embedded. The sensor housing serves to create a defined interface and enable easy handling, which is why it is preferably made of plastic. It is preferably a potting composite, meaning that the temperature sensor section and, if provided, also the spring element are injected into this potting compound, i.e., are firmly embedded therein. Corresponding latching or clamping sections, which are used for fixing in the housing recess, can also be formed in a simple manner in this way.

The interconnection ring itself preferably has a housing to which the housing recess is formed, that is, the housing recess is preferably an integral part of the housing but can also be attached thereto as a separate element. However, the integral design is preferred, in which case the housing is expediently made of plastic, since in this case such a geometry can easily be formed.

The housing preferably consists of a plastic potting composite, the conductor bridge together with the temperature sensor section being embedded in the potting composite. Here, too, similar to the sensor housing, a complete encapsulation is preferably carried out in order to reliably embed and fix the relevant components.

Furthermore, it is expedient if the housing recess is provided adjacent to a retainer serving to fix at least one connection conductor, which retainer is preferably integrally formed on the housing of the interconnection ring. This retainer, which is designed radially to the side of the housing, is used for local fixation of one or more connection conductors, which usually extend between the terminals of the HV power connection and the conductor ends of the winding a short distance around the circumference of the winding. Excessive swinging is prevented via the fixation in such a retainer. Since the connection conductors are therefore already fixed in position in the retainer, it makes sense to design the housing recess adjacent to such a retainer. Consequently, when the sensor housing is inserted into the retainer, the temperature sensor is automatically in thermal contact with the connection conductor accommodated in the adjacent retainer.

If the thermal contact of the temperature sensor is made with a conductor bridge, the housing recess is preferably formed as a circumferential extension of one end of the conductor bridge. This means that the housing recess is also formed in circumferential extension at the star point of the interconnection ring, which is slightly curved in the circumferential direction of the winding, so that simple integration and thermal coupling is also possible in this case.

BRIEF DESCRIPTION OF THE DRAWINGS

The disclosure is explained below on the basis of exemplary embodiments with reference to the drawings. The drawings are schematic representations, wherein.

DETAILED DESCRIPTION

Figure 1:
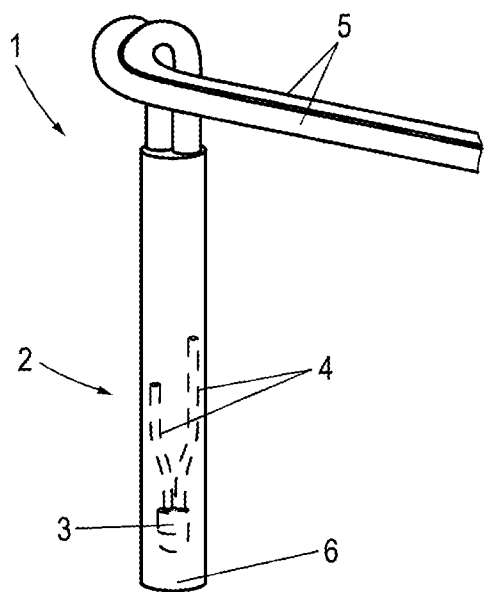
FIG. 1 shows a schematic diagram of a temperature sensor assembly.

FIG. 1 shows a schematic diagram of a temperature sensor assembly 1 comprising a temperature sensor section 2 with a temperature sensor 3, which is connected to sensor cables 5 via connection conductors 4. The temperature sensor 3 and the connecting conductors 4 can be arranged in a fixed position on a sensor carrier. In any case, they are covered with a shrink tube 6 for protection. In the example shown, the temperature sensor section 2 has an elongated cylindrical shape, but it can also be rectangular in cross section.

Figure 2:
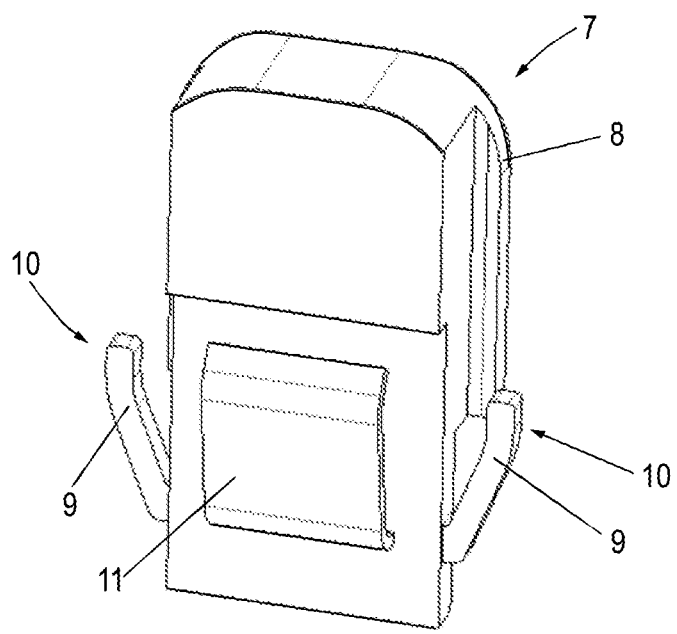
FIG. 2 shows a perspective view of a sensor housing without integrated temperature sensor assembly.

FIG. 2 shows a schematic view of a sensor housing 7 in which the temperature sensor section 2 is to be accommodated. The sensor housing 7 consists of a plastic potting compound, wherein either a corresponding elongated receptacle is formed for the temperature sensor section 2, into which it is inserted and fixed therein, for example via an adhesive, or wherein the potting compound is injection-molded directly around the sensor section 2.

The sensor housing 7 has two lateral guide webs 8 (see also FIG. 4) which serve, for example, to guide it in corresponding grooves on an interconnection ring where the sensor housing 7 is inserted, as will be discussed below.

Furthermore, two spring arms 9 with latching elements 10 provided thereon are integrally formed on the plastic sensor housing 7, which serve to fix the sensor in the housing recess of the interconnection ring, which will also be discussed below.

Furthermore, a spring element 11 is provided, in this case a leaf spring, which serves to spring the sensor housing 7 and with it the temperature sensor 3 against the element whose temperature is to be measured. This spring element 11, preferably a simple, outwardly curved leaf spring, is also preferably embedded in the plastic potting compound.

Figure 3:
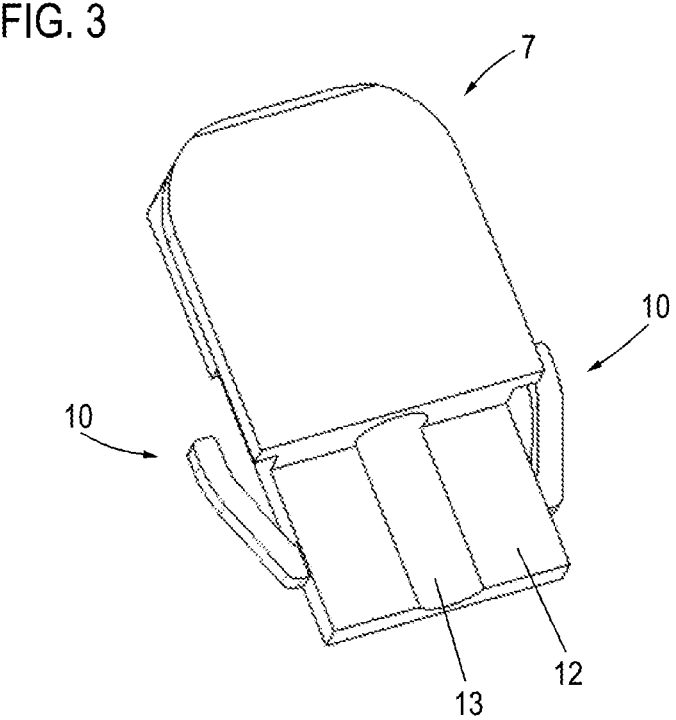
FIG. 3 shows the sensor housing from FIG. 2 from the other side.

FIG. 3 shows the rear view of the sensor housing 7, with a semicircular recess being formed on the plate section 12, which here, since the rear side is shown, is designed as a semicircular projection 13, the temperature sensor section 2 being partially guided in the recess.

Figure 4:
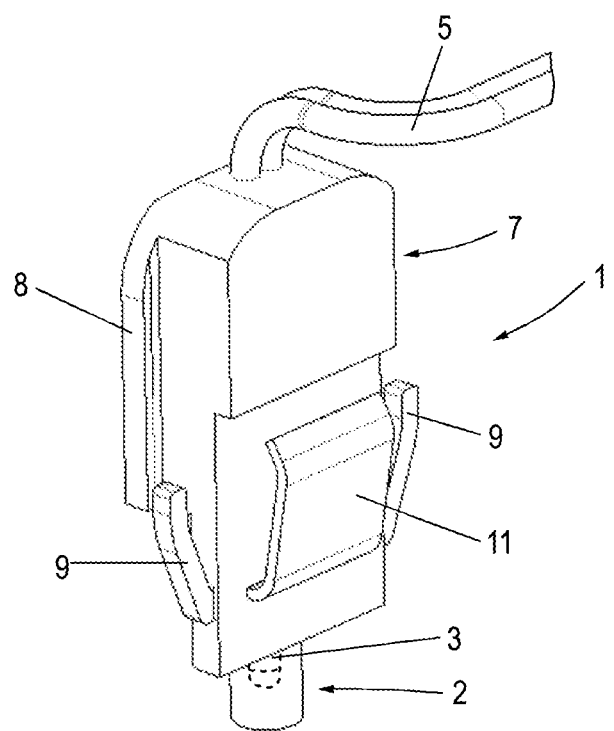
FIG. 4 shows the sensor housing with integrated temperature sensor assembly.

FIG. 4 shows the complete temperature sensor assembly 1, wherein the temperature sensor section 2 is accommodated in the sensor housing 7 and, as mentioned, is preferably injected, although separate mounting is also conceivable. It can be seen that the temperature sensor section 2 with the temperature sensor 3 protrudes slightly downward from the sensor housing 7.

Figure 5:
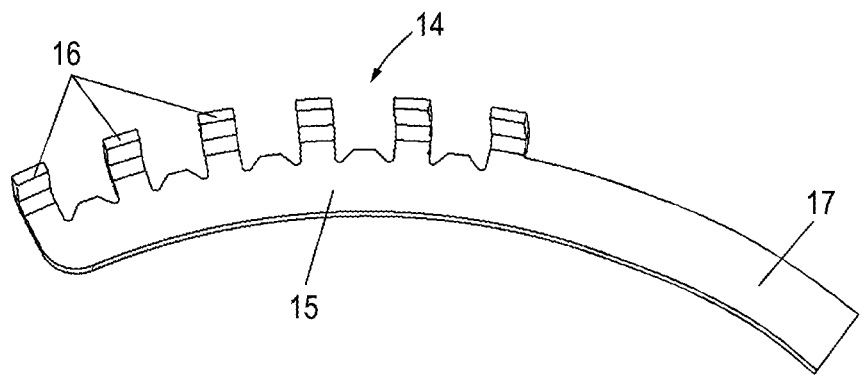
FIG. 5 shows a perspective view of a conductor bridge.

FIG. 5 shows a perspective view of a conductor bridge 14, having a curved base section 15 on which a plurality of connection sections 16 are formed for connection to ends of winding conductors. The conductor bridge 14 is a simple sheet metal component that can be punched and bent accordingly. At one end of the base section 15, a contact section 17 is provided which, as will be discussed below, can potentially come into thermal contact with the temperature sensor 3 when the temperature of this conductor bridge 14 is to be measured.

Figure 6:
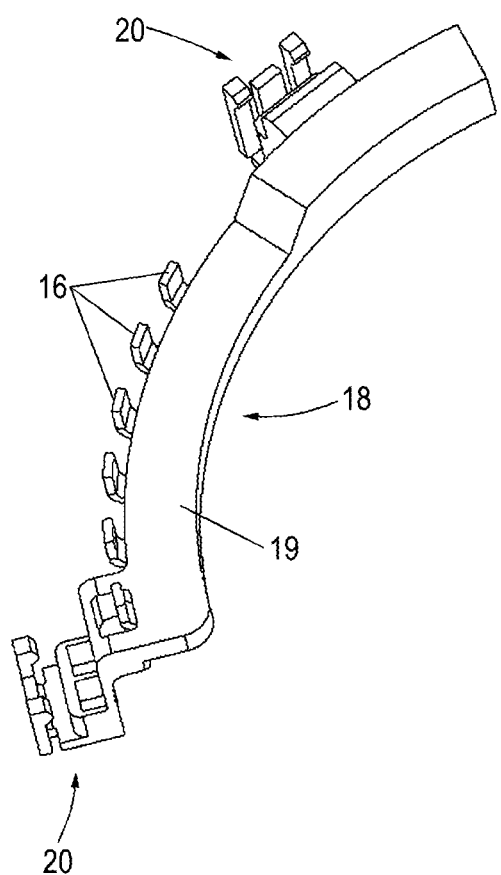
FIG. 6 shows a perspective view of the interconnection ring with conductor bridge integrated in the ring housing.

FIG. 6 shows an interconnection ring 18 comprising a housing 19, which is preferably made of a plastic potting compound and in which the conductor bridge 14 is embedded in such a way that only the connection sections 16 protrude laterally from the housing 19. As will be discussed below, the interconnection ring 18 is placed axially on a winding in the region of axially protruding conductor ends to be connected to the connection sections 16.

Furthermore, in the example shown, two retainers 20 are provided which serve to locally accommodate or fix connection conductors via which further conductor ends of the winding conductors are to be connected to connection terminals of a HV power supply. In these retainers 20, which are designed as latching or clamping receptacles and allow the connection conductors to be easily fixed, the connection conductors are fixed along their length so that they are only subject to minor vibrations. On such an interconnection ring, depending on the embodiment, a corresponding housing recess is now formed for receiving the sensor housing 7, namely at a position at which, with insertion of the sensor housing 7 into the housing recess, either direct thermal contact is made with a connection conductor received in a retainer 20, or with the contact section 17 of the conductor bridge 14.

Figure 7:
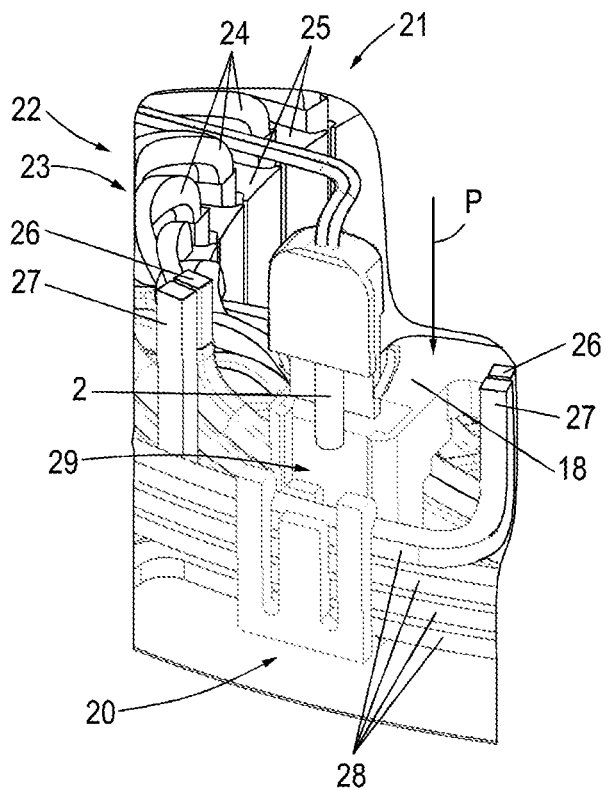
FIG. 7 shows a partial view of an electric machine according to the disclosure with an arranged interconnection ring with housing recess designed for thermal contact with a connection conductor and sensor housing not yet inserted.

FIG. 7 shows, in the form of a partial view, a schematic view of an electric machine 21 according to the disclosure, comprising a stator 22 with a winding 23 comprising a plurality of conductors 24 which are assigned, for example, to three separate phases. Each conductor 24 is designed almost like a U-shaped bracket, wherein a plurality of such U-shaped conductors, often also called hairpins, are plugged together to form the winding 23, which can also be referred to as a winding cage. The plurality of conductors define different radial planes. For this purpose, the conductors 24 extend, depending on the winding diagram, from one radial plane to another radial plane, for example an adjacent radial plane, in the region in which they are connected to the conductor ends of corresponding adjacent conductors continuing the phase conductor.

The conductors 24 are guided or bent and laid in such a way that corresponding recesses result, which extend radially so that corresponding stator teeth 25 engage in these recesses or the corresponding conductors 24 are wound between the corresponding grooves of the stator teeth 25. The basic structure of such a stator 22 or a winding 23 wound from the separate brackets described is basically known.

In the stator according to the disclosure, the ends of the conductors 24, in this case on the inner circumference of the annular winding 23, are positioned in an axially projecting manner, that is, they project axially from the winding 23. These ends are associated with individual conductors 24, which in turn are assigned to different phases, which is why the conductor ends must be connected according to the routing diagram of the conductor 24. The interconnection ring 18, which is placed axially on the end face of the winding 23, is used for this purpose. The interconnection ring 18 comprises the plurality of connection sections 16 to which the conductor ends, not shown in more detail here, are to be connected, preferably to be welded. In this way, the individual conductor ends and thus the winding conductors are contacted with the conductor bridge 24 of the interconnection ring, so that the meandering conductor run is interconnected through the winding.

Also shown in FIG. 7 are conductor ends 26 which are in contact with conductor ends 27 of connection conductors 28. These connection conductors 28 contact the individual phases of the winding 23 with corresponding connection terminals of a HV power connection not shown in more detail, via which the winding current is supplied. Here, too, the conductor ends 26, 27 are connected by welding.

As FIG. 7 shows, the connection conductors 28 are accommodated in a retainer 20 of the interconnection ring 18, they are inserted into the retainer 20 coming from above and are fixed therein by latching or clamping.

In the region of the retainer 20, adjacent thereto, a housing recess 29 is formed into which the sensor housing 7, as shown by the arrow P, is to be inserted by pushing it in. FIG. 7 shows the situation in which the sensor housing 7 has not yet been inserted. It can be seen that the exposed part of the temperature sensor section 2 runs forward freely.

Figure 8:
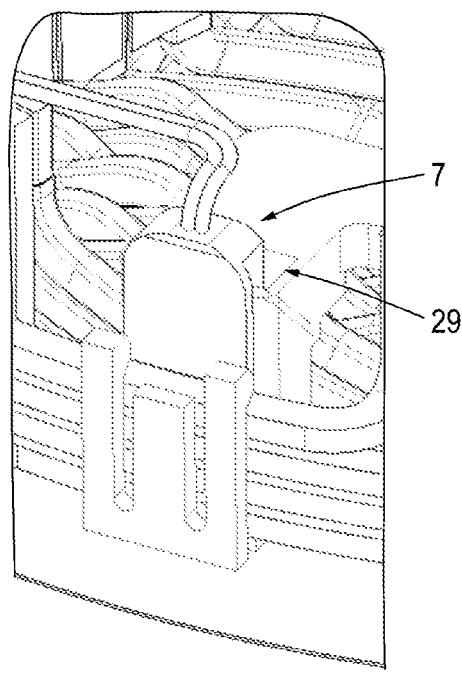
FIG. 8 shows the arrangement from FIG. 7 with the sensor housing inserted.

FIG. 8 shows the situation in which the sensor housing 7 together with the temperature sensor is inserted in the housing recess 29. The position is fixed by latching or clamping, for which purpose the spring arms 9 either jam in lateral guides of the housing recess or the latching elements 10 latch in corresponding latching recesses.

Figure 9:
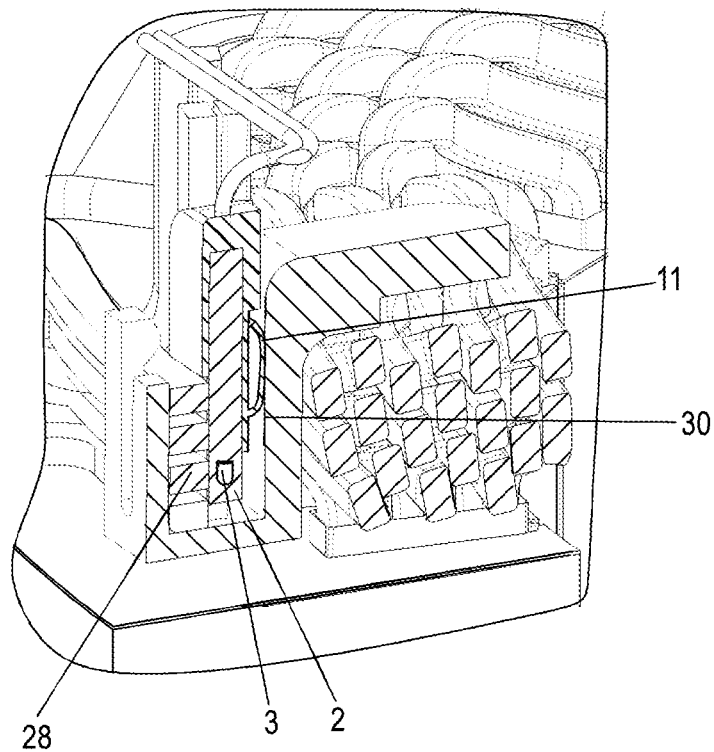
FIG. 9 shows a section view through the arrangement from FIG. 8.

FIG. 9 shows a section view through the arrangement from FIG. 8. It is evident that the exposed temperature sensor section 2 or the temperature sensor 3 is in direct thermal contact with a connection conductor 28. It is spring-loaded against this connection conductor 28 via the spring element 11, which is supported on the rear wall 30 of the housing recess 29.

By simply sliding the sensor housing 7 into the housing recess 29, the temperature sensor 3 can be reproducibly and accurately positioned and brought into thermal contact with a connection conductor 28. Disassembly is just as simple as assembly; in the event of maintenance, the sensor housing 7 merely has to be pulled out of the housing recess 29. The springing also provides a defined thermal contact, so that a very accurate measurement of the temperature of the connection conductor 28 is possible.

Figure 10:
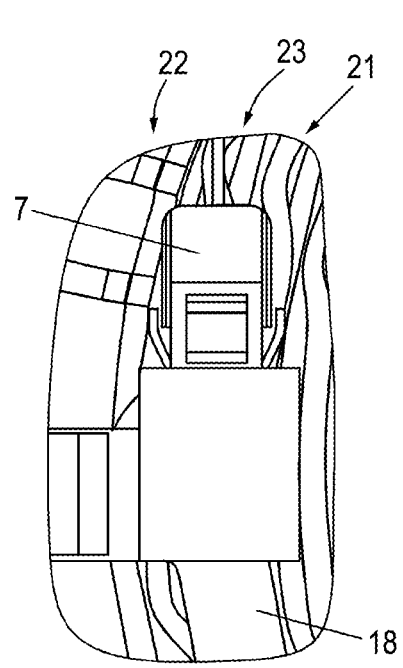
FIG. 10 shows a partial view of an electric machine according to the disclosure with housing recess formed at the interconnection ring for contacting with a conductor bridge with sensor housing not yet inserted.
Figure 11:
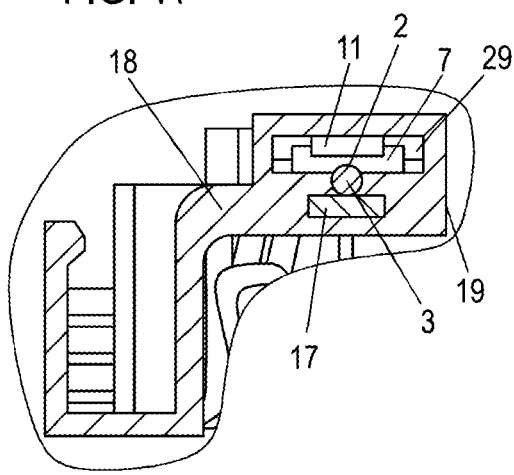
FIG. 11 shows a section view of the arrangement from FIG. 10 with the sensor housing inserted.

FIG. 10 shows an embodiment of an electric machine 21, the construction of which basically corresponds to that from FIGS. 7-9. Here, an interconnection ring 18 is placed on the winding 23 of the stator 22. In contrast to the embodiment according to FIGS. 7-9, the housing recess 29 is not formed here in the region of a retainer 20, but quasi at the end of the housing 19 of the interconnection ring 18, as FIG. 10 clearly shows. The housing recess 29 is virtually open at the end so that the sensor housing 7 can be inserted from the side, as shown in FIG. 10. In the assembly position, shown in section in FIG. 11, the sensor housing 7 is supported via the spring element 11. i.e., the leaf spring, against the wall bounding the housing recess 29 at the top, so that the exposed temperature sensor section 2 or the temperature sensor 3 is spring-loaded against the contact section 17, which is embedded in the plastic potting compound of the housing 19. Here, too, direct thermal contact is thus provided by simply pushing the sensor housing 7 into the housing recess 29, whereby the sensor housing 7 is also supported here via the spring arms 9 in the housing recess 29 or is clamped or latched therein.

Here, too, simple disassembly is possible by simply pulling out the sensor housing 7, whereby reproducible positioning and thus measuring conditions are always provided. At the same time, the temperature sensor 3 is also supported here, as in the above-described embodiment, against influences that impair the measurement, such as media flows or the like.

Regardless of whether the housing recess is located in the region of a retainer or in the region of the interconnection ring and thus the temperature of either a connection conductor or a conductor bridge is measured, it is always possible to measure directly on the winding side the temperature of a current-carrying component which heats up during operation, so that consequently the actual winding temperature can be measured in the region.

LIST OF REFERENCE NUMBERS

1 Temperature sensor assembly
2 Temperature sensor section
3 Temperature sensor
4 Connection conductor
5 Sensor cable
6 Shrink tube
7 Sensor housing
8 Guide web
9 Spring arm
10 Latching element
11 Spring element
12 Plate section
13 Retainer or protrusion
14 Conductor bridge
15 Base section
16 Connection section
17 Contact section
18 Interconnection ring
19 Housing
20 Retainer
21 Machine
22 Stator
23 Winding
24 Conductor
25 Stator tooth
26 Conductor end
27 Conductor end
28 Connection conductor
29 Housing recess
30 Rear wall
P Arrow

The invention claimed is:

1. An electric machine comprising a stator having a winding comprising a plurality of conductors assigned to one or more phases, which are connected to one another, as well as at least one temperature sensor assembly having a temperature sensor section with a temperature sensor for detecting a temperature in a region of the winding, wherein ends of at least one part of the plurality of conductors on an inner circumference or on an outer circumference of the winding protrude axially or radially over the winding, wherein an interconnection ring comprising at least one conductor bridge is placed axially or radially on the winding, to which at least one part of the plurality of conductors are connected, wherein the ends of at least two respective conductors of the plurality of conductors assigned to a phase protrude radially or axially outwards, to which at least one connection conductor is connected, which is also connected to a power connection arranged radially outside the winding, and wherein the temperature sensor section has a sensor housing which is introduced into a housing recess provided on the interconnection ring in such a way that the temperature sensor is in thermal contact with the connection conductor or the conductor bridge, wherein the housing recess is provided radially adjacent to a retainer configured to fix the at least one connection conductor.

2. The electric machine according to claim 1, wherein the sensor housing is fixed in the housing recess via a latching or clamping connection.

3. The electric machine according to claim 2, wherein two spring arms are provided on the sensor housing, which jam into the housing recess or which latch with latching elements provided thereon into latching recesses provided on the housing recess.

4. The electric machine according to claim 1, wherein the temperature sensor section protrudes from the sensor housing with an end having the temperature sensor.

5. The electric machine according to claim 1, wherein a spring element is provided on the sensor housing, by which it is spring-loaded in a direction of the connection conductor or the conductor bridge.

6. The electric machine according to claim 1, wherein the sensor housing is comprised of a plastic potting compound in which the temperature sensor section is embedded.

7. The electric machine according to claim 1, wherein the interconnection ring has a housing on which the housing recess is formed.

8. The electric machine according to claim 7, wherein the housing is comprised of a potting compound, wherein the conductor bridge together with the temperature sensor section is embedded in the potting compound.

9. The electric machine according to claim 1, wherein the housing recess is formed in extension of one end of the conductor bridge.

10. The electric machine according to claim 5, wherein the sensor housing is comprised of a plastic potting compound in which the temperature sensor section is embedded, and wherein the spring element is embedded in the potting compound in the sensor housing.

11. An electric machine comprising a stator having a winding comprising a plurality of conductors assigned to one or more phases, which are connected to one another, as well as at least one temperature sensor assembly having a temperature sensor section with a temperature sensor for detecting a temperature in a region of the winding, wherein ends of at least one part of the plurality of conductors on an inner circumference or on an outer circumference of the winding protrude axially or radially over the winding, wherein an interconnection ring comprising at least one conductor bridge is placed axially or radially on the winding, to which at least one part of the plurality of conductors are connected, wherein the ends of at least two respective conductors of the plurality of conductors assigned to a phase protrude radially or axially outwards, to which at least one connection conductor is connected, which is also connected to a power connection arranged radially outside the winding, and wherein the temperature sensor section has a sensor housing which is introduced into a housing recess provided on the interconnection ring in such a way that the temperature sensor is in thermal contact with the connection conductor or the conductor bridge, wherein the housing recess is located radially inwardly from the connection conductor and aligned radially therewith.

* * * * *